United States Patent [19]
Granlund et al.

[11] Patent Number: 5,710,974
[45] Date of Patent: Jan. 20, 1998

[54] METHOD FOR IMPROVING THE RELIABILITY OF A HANDOVER AND CALL ESTABLISHMENT, AND A CELLULAR RADIO SYSTEM

[75] Inventors: Seppo Granlund, Helsinki; Hannu Häkkinen; Seppo Hämäläinen, both of Espoo, all of Finland

[73] Assignee: Nokia Mobile Phones Ltd., Salo, Finland

[21] Appl. No.: 648,656

[22] Filed: May 15, 1996

[30] Foreign Application Priority Data

May 17, 1995 [FI] Finland ................. 952396

[51] Int. Cl.⁶ .................. H04Q 7/00; H04Q 9/00
[52] U.S. Cl. ............. 455/33.2; 455/54.1; 455/62; 455/63; 455/67.1; 379/60
[58] Field of Search ................. 455/33.1, 33.2, 455/62, 63, 67.1, 67.3, 54.1, 69, 53.1; 379/60; 370/335, 342, 441

[56] References Cited

U.S. PATENT DOCUMENTS

| | | | |
|---|---|---|---|
| 5,109,390 | 4/1992 | Gilhousen et al. | 375/1 |
| 5,267,261 | 11/1993 | Blakeney, II et al. | |
| 5,287,544 | 2/1994 | Menich et al. | 455/33.1 |
| 5,309,503 | 5/1994 | Bruckert et al. | 379/60 |
| 5,345,448 | 9/1994 | Keskitalo | 370/95.3 |
| 5,379,447 | 1/1995 | Bonta et al. | 455/33.2 |
| 5,410,733 | 4/1995 | Niva et al. | 455/33.2 |
| 5,483,668 | 1/1996 | Malkamaki et al. | 455/33.2 |
| 5,524,009 | 6/1996 | Tuutijarvi et al. | 370/95.3 |
| 5,539,728 | 7/1996 | Gaiani et al. | 370/18 |
| 5,577,022 | 11/1996 | Padovani et al. | 370/13 |

FOREIGN PATENT DOCUMENTS

| | | |
|---|---|---|
| 0 530 165 A2 | 3/1993 | European Pat. Off. |
| WO 92/10914 | 6/1992 | WIPO |
| WO 95/28808 | 10/1995 | WIPO |

*Primary Examiner*—Andrew Faile
*Assistant Examiner*—Vincent F. Boccio
*Attorney, Agent, or Firm*—Perman & Green, LLP

[57] ABSTRACT

The invention relates to a method for improving the reliability of a handover and call establishment in a cellular radio system which comprises at least one base station in each cell, and a group of subscriber terminal equipments which communicate with one or more base stations. The base stations measure the total interference level of signals they have received from the terminal equipments, and transmit a pilot signal with a known transmit power. The terminal equipments measure the power levels of pilot signals received from different base stations. In the system at least some transceivers comprise circuitry for estimating, by means of the pilot signals, the path loss between the terminal equipment and the base stations. To improve the reliability of the handover and call establishment, at least some transceivers in the system of the invention estimate the signal to noise ratio between the terminal equipment and the base station in the uplink transmission direction on the basis of the total interference measured at the base station, the path loss, and the terminal equipment transmit power.

15 Claims, 2 Drawing Sheets

METHOD FOR IMPROVING THE RELIABILITY OF A HANDOVER AND CALL ESTABLISHMENT, AND A CELLULAR RADIO SYSTEM

FIELD OF THE INVENTION

The present invention relates to a method for improving the reliability of a handover and call establishment in a cellular radio system which comprises at least one base station in each cell, and a group of subscriber terminal equipments which communicate with one or more base stations, which base stations measure the total interference level of signals they have received from the terminal equipments, and transmit a pilot signal with a known transmit power, and which terminal equipments measure, in order to determine the need for a handover, the power levels of pilot signals from those base stations which are on a terminal equipment maintained list of near-by base stations, and in which method the path loss between the terminal equipment and the base stations is estimated by means of the pilot signals.

The present invention is suitable for use in all interference limited cellular radio systems, and particularly in a cellular radio system utilizing code division multiple access.

BACKGROUND OF THE INVENTION

A CDMA (Code Division Multiple Access) system is a multiple access method which is based on spread spectrum technology and whose application in cellular radio systems has lately been initiated along with the earlier FDMA (Frequency Division Multiple Access) and TDMA (Time Division Multiple Access) technologies. The CDMA technology has several advantages over the earlier methods, such as spectral efficiency and simple frequency planning. One example of a prior art CDMA system is the wide-band cellular radio standard EIA/TIA IS-95.

In a CDMA method, the narrow-band data signal of the user is multiplied, by a spreading code of much wider bandwidth, to a relatively wide band. In the known experimental systems, the bandwidths used include, for example, 1.25 MHz, 10 MHz and 25 MHz. In the multiplying process, the data signal spreads to the whole band used. All users transmit simultaneously by using the same frequency band, i.e. traffic channel. A separate spreading code is employed for each connection between a base station and a mobile station, and the signals from the users can be identified from one another in the receivers on the basis of the spreading code of each connection.

Adapted filters in the receivers are synchronized with the desired signal, which is identified on the basis of the spreading code. The data signal is returned in the receiver onto the original band by multiplying it by the same spreading code as in the transmission phase. The signals which have been multiplied by some other spreading code neither correlate nor return to the narrow band in an ideal case. They thus appear as noise from the point of view of the desired signal. An attempt is made for choosing the spreading codes so that they are mutually orthogonal, i.e. they do not correlate with each other.

In a typical mobile station environment, signals between a base station and a mobile station travel by several different paths between the transmitter and the receiver. This multipath propagation is mainly caused by signals reflecting from the surrounding surfaces. Signals that have travelled through different paths arrive at the receiver at different times due to different delays in the propagation time. In the CDMA method, the multipath propagation can be utilized in the reception of signals by means of diversity. As a CDMA receiver solution, a receiver structure consisting of several branches is commonly employed. Each branch is synchronized with a signal component that has travelled along a path of its own. Thus, each branch is an independent receiving element whose function is to combine and demodulate one received signal component. In a conventional CDMA receiver, the signals of the various receiving elements are advantageously combined either in a coherent or incoherent way, whereby a good quality signal is obtained.

Several prior art CDMA systems employ a so-called pilot signal, which is transmitted by each base station, and which is utilized in the identification of a base station, power measurement, and for enabling a coherent reception in a mobile station. The pilot signal is not modulated with data, is spread with a predetermined spreading code, and it is transmitted to the coverage area of the base station in the same way as the actual traffic channels. In fact, the coverage area of the pilot signal determines the size of the cell of the base station, since the terminal equipments utilize it in call establishment.

The base stations transmit the pilot signal continuously, and the spreading codes used in the transmission of the pilot signal of different base stations differ from one another, so that a terminal equipment is able to identify the base stations on the basis of the pilot signal they transmit.

A given subscriber terminal equipment continuously measures the pilot signals. In the prior art systems, to reduce the measurement load of the terminal equipment, each terminal equipment maintains a list of those base stations that are located near-by the terminal equipment, and of the corresponding spreading codes of the pilot signals, and which therefore are possible candidates for a handover or call establishment. In the following, such a list will be referred to as a measurement list. The terminal equipments primarily monitor the pilot signals of only those base stations that are included on this list. Secondarily, other pilot signals detected are measured.

As the terminal equipment roams, the measurement list must naturally be updated as required. In prior art systems, the updating is carried out on the basis of the terminal equipment measuring the strength of the pilot signal, i.e. if the measurements by the terminal equipment indicate that a pilot from a specific base station is received with a sufficient strength, it is added to the measurement list.

In a CDMA network offering several services, situations may exist in which the load on the base station in the transmission direction from the terminal equipment to the base station, i.e. in the uplink direction, is considerably heavier than in the opposite direction. The prior art solutions for updating the measurement list do not detect the load on the base station in this direction.

Normally, the only criterion employed for updating the measurement list is the attenuation caused to the pilot signal by the path loss. This means that pilot signals received from different base stations, or signal to noise ratios of the signals, are compared to one another, and on the basis of this comparison a decision is made on the updating of the measurement list. The method above does not, however, take into account a situation in which the opposite transmission direction of a target base station is under a significantly heavier load than the direction measured. This is a profound disadvantage, particularly in systems having asymmetric load conditions in opposite transmission directions.

An attempt has been made to solve, at the base station, the load problem in the uplink direction by adjusting the transmit power of the pilot signal in accordance with the load of the uplink direction. However, this method changes the situation of all the terminal equipments located within the service area of the base station. Hence, a connection-specific decision concerning the updating of the measurement list cannot be made on the basis of the quality of the uplink transmission direction.

The same problem also concerns call establishment, resulting in that a terminal equipment may transmit a call establishment message to a base station whose uplink transmission direction is overloaded.

SUMMARY OF THE INVENTION

It is an object of the present invention to provide a method by means of which the updating of the measurement list and, consequently, handover and call establishment can be made more reliable by taking into consideration the load condition of the uplink transmission direction. A further object of the invention is to enable a connection-specific analysis of the uplink direction.

This is achieved by a method of the type set forth in the introduction for improving the reliability of a handover, which is characterized in that the signal to noise ratio between the terminal equipment and the base station in the transmission direction from the terminal equipment to the base station is estimated on the basis of total interference measured at the base station, the path loss, and the terminal equipment transmit power, and that the list maintained by each subscriber terminal equipment of near-by base stations is updated on the basis of said estimate.

The method of the type set forth in the introduction for improving the reliability of a handover is characterized in that the signal to noise ratio between the terminal equipment and the base station in the transmission direction from the terminal equipment to the base station is estimated on the basis of total interference measured at the base station, the path loss, and the terminal equipment transmit power, and that said estimate is utilized in selecting the base station to which the terminal equipment seeks to establish a connection when it needs a traffic channel.

In addition, the invention relates to a cellular radio system which comprises at least one base station in each cell, and a group of subscriber terminal equipments which communicate with one or more base stations. The base stations comprise circuitry for measuring the total interference level of signals they have received from the terminal equipments, and circuitry for transmitting pilot signals with a known transmit power the terminal equipments comprise circuitry for measuring the power levels of pilot signals they have received from different base stations. In the cellular radio system at least some transceivers comprise circuitry for estimating, by means of the pilot signals, the path loss between the terminal equipment and the base stations. The cellular radio system of the invention is characterized in that at least some transceivers in the cellular radio system comprise circuitry for estimating the signal to noise ratio between the terminal equipment and the base station in the transmission direction from the terminal equipment to the base station on the basis of the total interference measured at the base station, the path loss, and the terminal equipment transmit power.

The method according to the invention provides a solution to the measurement list updating algorithm in a situation, in which a base station whose load in the uplink direction is far heavier than in the downlink direction, is about to be added to the measurement list. On the basis of the estimate calculated, base stations that have low a low quality prediction for the uplink direction will not be added to the list. In the method of the invention, the estimation can be carried out either at the subscriber terminal equipment or at the base station.

By means of the method of the invention, it is also possible, at the call establishment stage, to prevent a terminal equipment from establishing a connection to a cell whose load in the uplink direction is heavy.

BRIEF DESCRIPTION OF THE DRAWINGS

In the following, the invention will be described in greater detail with reference to the examples in the attached drawings, in which.

DETAILED DESCRIPTION OF THE INVENTION

Figure 1:
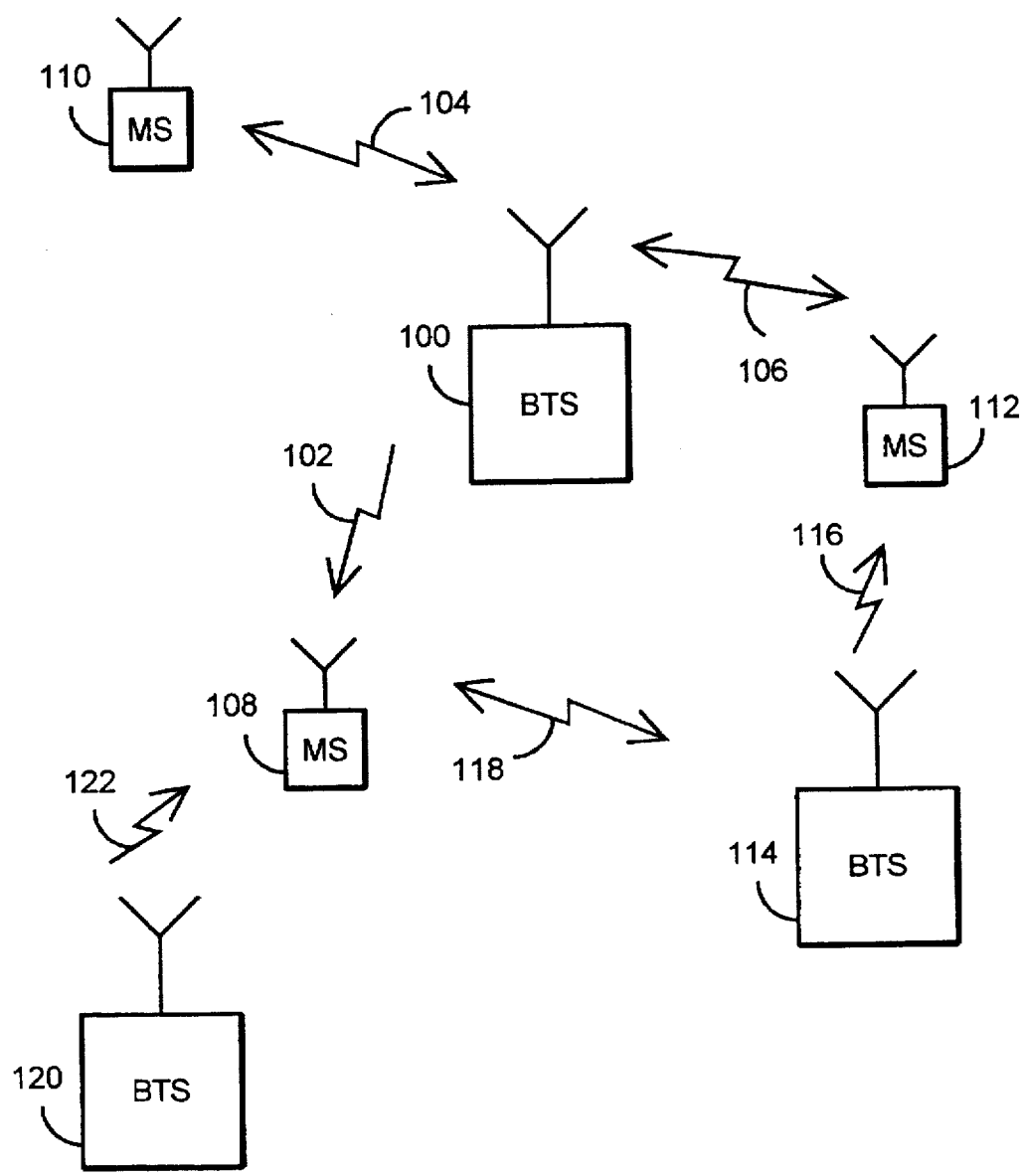
FIG. 1 illustrates a cellular radio system to which the method according to the invention can be applied.

FIG. 1 shows a diagram of a cellular radio system to which the method of the invention can be applied. The cellular radio system network comprises a group of base stations 100, 114, 120 which communicate on a specific traffic channel with the subscriber terminal equipments within its service area. In a CDMA system, the traffic channel is thus formed of a wide frequency band which is used by all the terminal equipments during transmission to the base station. Correspondingly, there is a similar frequency band in use in the other transmission direction from the base station to the terminal equipments, the frequency band being used by the base station during transmission to the terminal equipments within its service area. In the exemplary case of the figure, the terminal equipments 110 and 112 communicate with the base station 100, and the terminal equipment 108 communicates with the base station 114.

In the exemplary system of FIG. 1, each connection typically employs a separate spreading code whose bit rate, i.e. a so-called chip rate, is essentially higher than the data rate, and by which the information to be transmitted is multiplied and consequently spread onto a wide frequency band. On the basis of the spreading code, the receivers are able to identify the desired signal from among other signals transmitted on the same frequency band. In the service areas of the base stations 100, 114, and 120, the same frequency band is in use.

Thus, each base station transmits a pilot signal, which the terminal equipments utilize, for example, in the identification and power measurement of the base stations. The pilot signal is a data unmodulated, spreading coded signal, which is transmitted to the base station service area just like ordinary traffic channels. The pilot signal is transmitted continuously, and the spreading codes that different base stations use in transmitting pilot signals differ from one another, enabling the terminal equipment to identify the base stations on the basis of the pilots the base stations transmit.

The subscriber terminal equipments 108, 110 and 112 continuously measure the quality of the pilot signals transmitted from the different base stations. This is necessary for the terminal equipment to maintain the connection quality.

On the basis of the measurements, a handover can be performed to a base station offering a better quality connection. In a CDMA system, it is also possible that the terminal equipment simultaneously communicates with more than one base station. Such a situation is referred to as macro diversity. The pilot measurements are essential also at the call establishment stage, because the terminal equipment, upon transmitting a call establishment message, will select the base station that offers the best quality connection.

As mentioned above, each terminal equipment has a list of those base stations that are located near-by the terminal equipment, and of the corresponding spreading codes of the pilot signals, and which therefore are possible candidates for a handover or call establishment. The terminal equipment measures all the pilot signals it can receive, but the ones that are included on the measurement list are measured more often than the rest, because it is more probable that a handover or call establishment will be carried out to the base stations that are included on the measurement list than to base stations further away. The aim is to save the measuring capacity of the terminal equipment, and, on the other hand, to direct it at those signals whose variations must be detected as rapidly as practical.

In the following, the method according to the invention will be described at first assuming that the estimation required is carried out at the subscriber terminal equipment (108, 110, 112).

On the control channels, the base stations 100, 114, 120 transmit information to the terminal equipments 108, 110, 112 on the transmit power $P_{t,pilot}$ used for the transmission of the pilot signal. Each terminal equipment measures the power level $P_{r,pilot}$ at which each pilot signal from each base station is received. On the basis of said information and the power measurement carried out, each terminal equipment is able to calculate the path loss L between the base station and the terminal equipment, i.e. the attenuation of the transmitted signal on the radio path according to the following formula:

$$L = \frac{P_{t,pilot}}{P_{r,pilot}}.$$

On the control channel, the base stations 100, 114, 120 also transmit information to the terminal equipments 108, 100, 112 on the interference level $I_{tot}$ they have has measured in the uplink transmission direction. This information is sent from the base stations to the terminal equipments whenever the information changes, i.e. when there are significant changes in the interference level. Consequently, the terminal equipments can be provided with interference information of several near-by base stations.

In the solution according to the invention, the signal to noise ratio of the uplink transmission direction, i.e. the transmission direction from the terminal equipment to the base station, is estimated. The transmission direction in question does not necessarily have to exist as yet. This may be the case in a situation in which the terminal equipment is not communicating with any base station, and will decide to which base station to sent a call establishment message on the basis of the estimate it has calculated, and on the basis of the pilot signal measurements. In the solution according to the invention, the connection quality of the uplink direction can thus be estimated in advance.

The terminal equipment carries out the estimation by first calculating the path loss between the base station and the terminal equipment, as disclosed above. Furthermore, the terminal equipment knows the transmit power $P_{MS}$ that it is using, which is either the actual transmit power in case the terminal equipment communicates with the base station being estimated, or an assumed transmit power, which may be so chosen as to achieve a suitable estimated SIR on the basis of, if necessary, several estimation cycles.

In addition, the terminal equipment divides the transmit power $P_{MS}$ by the path loss L. After this, the estimate SIR of the signal to noise ratio in the uplink direction can be obtained by dividing said divided power by the base station total interference, from which the influence of the signal originating in the estimating terminal equipment has been subtracted:

$$SIR = \frac{\frac{P_{MS}}{L}}{I_{tot} - \frac{P_{MS}}{L}}.$$

If it is desired that calculation procedures be reduced, a coarser estimate can be calculated for the signal to noise ratio, from which the influence of the signal originating in the estimating terminal equipment has not been subtracted:

$$SIR = \frac{\frac{P_{MS}}{L}}{I_{tot}}.$$

In the above, SIR is presented as a relation between two power levels, but if desired, SIR can also be presented by means of other units, such as decibels.

By means of the estimate calculated for the signal to noise ratio, it is possible to update the measurement list of the terminal equipment or to control the transmission of the call establishment message.

Even if the estimation is not carried out at the terminal equipment but in the network, for example at the base station, the estimation can still be carried out as described above and by using the formulas. Via the control channel, the terminal equipment must, however, transfer information to the base station on the power level $P_{r,pilot}$ of the received pilot and on the transmit power $P_{MS}$ used by the terminal equipment. Correspondingly, the base station does not have to inform the terminal equipments of the total level of interference $I_{tot}$.

If the terminal equipment does not communicate with any base station, signalling between the base station and the terminal equipment takes place by using the common calling channels.

In the exemplary case below, it is assumed that in a situation according to FIG. 1, the terminal equipment 112 communicates on the traffic channel 106 with the base station 100, and that the base stations 100 and 114 are included on its measurement list. Hence, the terminal equipment 112 actively monitors the pilot signals 106 and 116, and measures their strength. It is further assumed that the terminal equipment 108 communicates on the traffic channel 118 with the base station 114, and that the base stations 100 and 114 are included on its measurement list. Hence, the terminal equipment 108 actively monitors the pilot signals 102 and 118, and measures their strength. The terminal equipment 108 also measures the pilot signal 122 transmitted by the base station 120, although it is not included on its measurement list, because the signal quality does not as yet fulfil the criteria. It is further assumed that the terminal equipment estimates the signal to noise ratio of the base station 120 in the uplink transmission direction, and finds the ratio to be very good. A decision can now be made to add the base station 120, too, onto the measurement list as it is a noteworthy candidate for a handover due to the good quality of the uplink transmission direction.

Figure 2:
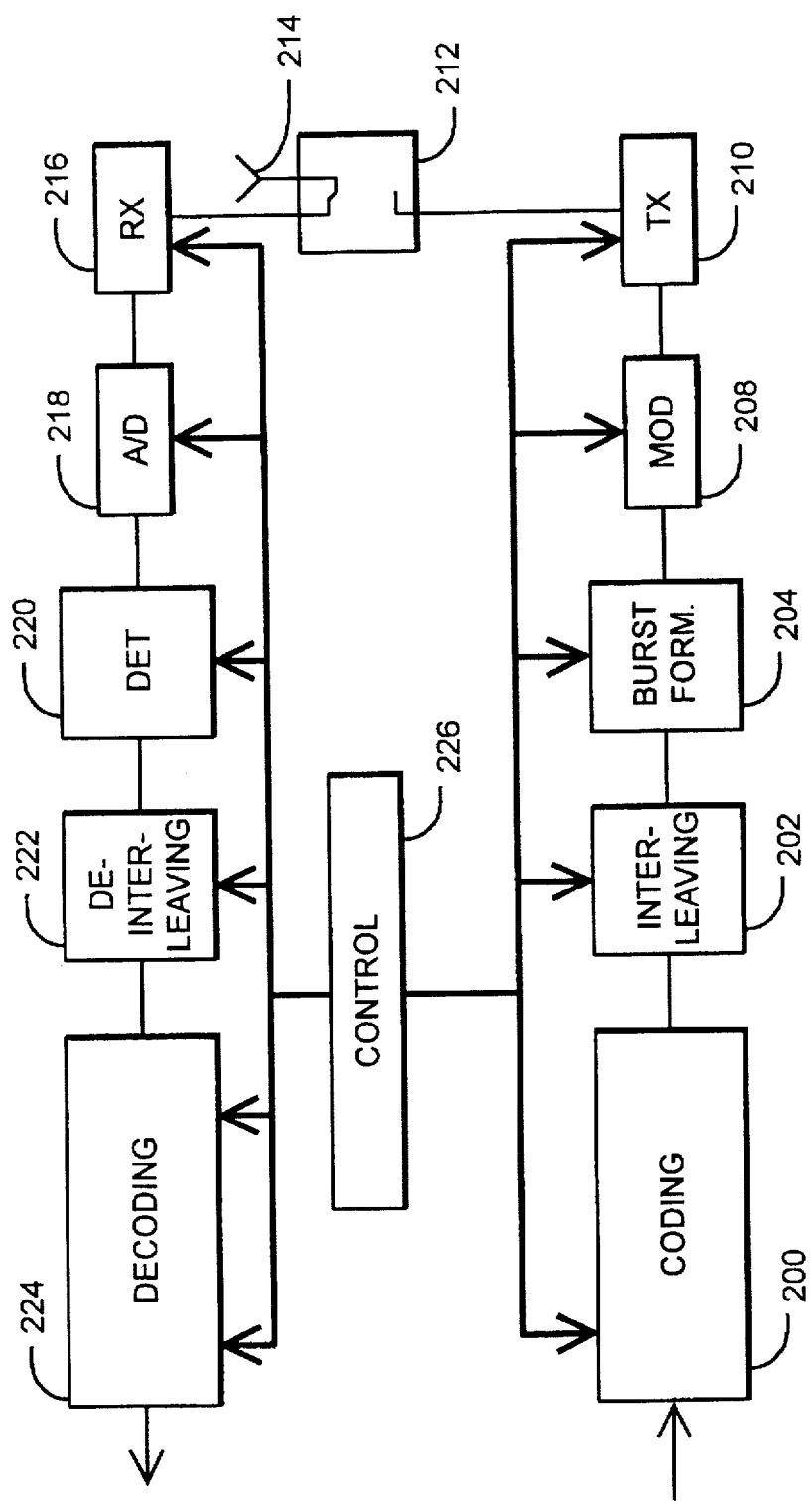
FIG. 2 is a block diagram illustration of the structure of a transceiver in the cellular radio system according to the invention.

In the following, the structure of a transceiver used in the cellular radio system of the invention will be examined. FIG. 2 illustrates a transceiver of a cellular radio system, to which transceiver the method in accordance with the invention can be applied. The transceiver may be located at the base station equipment, or it may be a terminal equipment. As far as the present invention is concerned, the essential parts in both the alternatives have a similar equipment structure.

The transceiver comprises a means for coding 200 the signal to be transmitted, the means being used for feeding the coded signal to a means 202 for the coded signal to be interleaved. The output signal of the interleaving means is connected to the input of a means 204 in which the burst to be sent is produced. The signal thus obtained is fed to a modulating means 208 whose output signal is fed through a transmitter unit 210 and a duplex filter 212 to an antenna 214. The aforementioned blocks can be implemented by prior art methods.

The transceiver further comprises a receiving unit 216 in which the received signal is transformed onto an intermediate frequency, and a converting means 218 in which the signal is converted into digital form. The converted signal is fed to a detecting means 220, from which the detected signal is further fed to a deinterleaving means 222 and a means 224 in which the received signal is decoded, i.e. both channel and speech decodings are carried out. The equipment further comprises control and calculation means 226 which control the operation of the aforementioned blocks. Typically, the control means is implemented by means of a processor.

The base station equipment according to the invention comprises means 220, 226 for measuring the total interference of signals it has received from the terminal equipments, and means 200–214, 226 for transmitting a pilot signal with a known transmit power. Correspondingly, the subscriber terminal equipment comprises means 220, 226 for measuring the strength of the pilot signal it has received from the base station. In case of a CDMA system, the detector block of the receiver, which is typically implemented by a RAKE principle, customarily includes several receiving branches out of which at least one is a so-called searcher branch measuring the strength of the pilot signals.

The transceiver of the cellular radio system of the invention also comprises means 220, 226 for estimating the path loss between the terminal equipment and the base station by means of the power level of the pilot signal received and the power used in the transmission. The transceiver of the cellular radio system of the invention further comprises means 220, 226 for estimating, in accordance with the method disclosed above, the signal to noise ratio of the uplink transmission direction on the basis of the total interference measured and the path loss as well as on the basis of the terminal equipment transmit power.

Although the invention is described in the above with reference to the example of the attached drawings, it is obvious that the invention is not restricted thereto but may be varied in several ways within the inventive idea of the attached claims.

We claim:

1. A method for improving the reliability of a handover in a cellular radio system which comprises at least one base station in each cell, and a group of subscriber terminal equipments which communicate with one or more base stations, comprising steps of:

measuring at a base station a total interference level of signals received from the terminal equipments, and transmitting a pilot signal with a known transmit power, measuring at a subscriber terminal equipment, in order to determine the need for a handover, the power levels of pilot signals received from those base stations which are on a terminal equipment maintained list of near-by base stations, and in which a path loss between the terminal equipment and the base stations is estimated by means of the received pilot signals, wherein the signal to noise ratio between the terminal equipment and the base station in the transmission direction from the terminal equipment to the base station is estimated on the basis of the total interference measured at the base station, the path loss, and the terminal equipment transmit power, and wherein the list maintained by each subscriber terminal equipment of near-by base stations is updated on the basis of said estimate.

2. A method for improving the reliability of call establishment in a cellular radio system which comprises at least one base station in each cell, and a group of subscriber terminal equipments which communicate with one or more base stations, comprising steps of:

measuring at a base station a total interference level of signals received from the terminal equipments, and transmitting a pilot signal with a known transmit power, measuring, at a subscriber terminal equipment, in order to determine the need for a handover, the power levels of pilot signals received from those base stations which are on the terminal equipment maintained list of near-by base stations, and in which a path loss between the terminal equipment and the base stations is estimated by means of the received pilot signals, wherein the signal to noise ratio between the terminal equipment and the base station in the transmission direction from the terminal equipment to the base station is estimated on the basis of the total interference measured at the base station, the path loss, and the terminal equipment transmit power, and wherein said estimate is utilized in selecting the base station to which the terminal equipment seeks to establish a connection when it requires a traffic channel.

3. The method as claimed in claim 1, wherein the estimate for the signal to noise ratio is obtained by dividing the transmit power of the terminal equipment by the estimated path loss, and calculating the ratio between the value thus obtained and the total interference measured at the base station.

4. The method as claimed in claim 3, wherein the effect of a current or future base station/terminal equipment connection to the total interference is subtracted from the total interference prior to calculating the estimate for signal to noise ratio.

5. A method as claimed in claim 3, wherein the signal to noise ratio between the subscriber terminal equipment and the base station is estimated at the base station.

6. A method as claimed in claim 3, wherein the signal to noise ratio between the subscriber terminal equipment and the base station is estimated at the subscriber terminal equipment.

7. The method as claimed in claim 3, wherein the signal to noise ratio between the subscriber terminal equipment and the base station is estimated prior to establishing a connection.

8. A cellular radio system which comprises at least one base station in each cell, and a group of subscriber terminal equipments which communicate with one or more base stations, which base stations comprise
- a means for measuring total interference level of signals they have received from the terminal equipments, and
- a means for transmitting a pilot signal with a known transmit power, and which terminal equipments comprise
- a means for measuring power levels of pilot signals they have received from different base stations, and in which in the cellular radio system at least some transceivers comprise
- a means for estimating, by means of the pilot signals, the path loss between the terminal equipment and the base stations, wherein at least some transceivers in the cellular radio system comprise means for estimating the signal to noise ratio between the terminal equipment and the base station in the transmission direction from the terminal equipment to the base station on the basis of the total interference measured at the base station, the path loss, and the terminal equipment transmit power.

9. The cellular radio system as claimed in claim 8, wherein the means for estimating the signal to noise ratio between the terminal equipment and the base station in the transmission direction from the terminal equipment to the base station is located at the subscriber terminal equipment.

10. The cellular radio system as claimed in claim 8, wherein the means for estimating the signal to noise ratio between the terminal equipment and the base station in the transmission direction from the terminal equipment to the base station is located at the base station.

11. The method as claimed in claim 2, wherein the estimate for the signal to noise ratio is obtained by dividing the transmit power of the terminal equipment by the estimated path loss, and calculating the ratio between the value thus obtained and the total interference measured at the base station.

12. The method as claimed in claim 11, wherein the effect of a current or future base station/terminal equipment connection to the total interference is subtracted from the total interference prior to calculating the estimate for signal to noise ratio.

13. The method as claimed in claim 11, wherein the signal to noise ratio between the subscriber terminal equipment and the base station is estimated at the base station.

14. The method as claimed in claim 11, wherein the signal to noise ratio between the subscriber terminal equipment and the base station is estimated at the subscriber terminal equipment.

15. The method as claimed in claim 11, wherein the signal to noise ratio between the subscriber terminal equipment and the base station is estimated prior to establishing a connection.

* * * * *

UNITED STATES PATENT AND TRADEMARK OFFICE
CERTIFICATE OF CORRECTION

PATENT NO.   :   5,710,974

DATED        :   January 20, 1998

INVENTOR(S)  :   Granlund et al.

It is certified that error appears in the above-identified patent and that said Letters Patent is hereby corrected as shown below:

In col. 9, claim 8, line 8, after "stations," insert --individual ones of base stations and subscriber terminal equipments comprising a RF transceiver--.

In col. 9, claim 8, line 8, after "which" insert --said--.

In col. 9, claim 8, line 8, after "stations" insert --further--.

In col. 9, claim 8, line 8, after "comprise" insert --:-- (a colon).

In col. 9, claim 8, line 9, delete "a".

In col. 9, claim 8, line 10, delete "they have".

In col. 9, claim 8, line 11, delete "a".

In col. 9, claim 8, line 12, after "which" insert --said subscriber--.

In col. 9, claim 8, line 12, after "equipments" insert --further--.

In col. 9, claim 8, lines 12 and 13, after "comprise" insert --,-- (a comma).

In col. 9, claim 8, line 14, delete "a".

In col. 9, claim 8, lines 14 and 15, delete "they have".

In col. 9, claim 8, line 16, after "some" insert --of said--.

In col. 9, claim 8, line 18, delete "a".

In col. 9, claim 8, line 22, delete "the" and insert --a-- thereof.

UNITED STATES PATENT AND TRADEMARK OFFICE
CERTIFICATE OF CORRECTION

PATENT NO. : 5,710,974
DATED : January 20, 1998
INVENTOR(S) : Granlund et al.

It is certified that error appears in the above-identified patent and that said Letters Patent is hereby corrected as shown below:

In col. 9, claim 8, line 24, after "station" insert --,-- (a comma).

In col. 9, claim 8, line 25, after "station" insert --,-- (a comma).

Signed and Sealed this

Seventeenth Day of March, 1998

Attest:

BRUCE LEHMAN

Attesting Officer

Commissioner of Patents and Trademarks